Aug. 23, 1960 W. J. RUEGER 2,950,161

COAXIAL MAGNETIC PRINTING HEAD

Filed April 3, 1956

INVENTOR.
WILLIAM J. RUEGER

BY [signature]

ATTORNEY

United States Patent Office 2,950,161
Patented Aug. 23, 1960

2,950,161

COAXIAL MAGNETIC PRINTING HEAD

William J. Rueger, Pleasant Valley, N.Y., assignor to International Business Machines Corporation, New York, N.Y., a corporation of New York Filed Apr. 3, 1956, Ser. No. 575,830

3 Claims. (Cl. 346—74)

This invention relates to magnetic printing and more particularly to an improved magnetic head for effecting the magnetic writing step of a magnetic printing process.

By definition, magnetic printing is the writing or production of a magnetic pattern on a magnetic material, the dusting of the pattern with magnetic ink to form an image, and the transferring of the magnetic ink image to a page, as by a pressure printing process. The transferred image is then usually fixed to the page, by heating or some similar process. One of the basic problems with magnetic printing is the formation of magnetic patterns in such a manner that a uniform line density for the entire character is brought about during the inking process. That is, if the pattern is made up of an array of magnetic spots, or particles, then the spots or particles should be so arranged on the magnetic material that opposite magnetic poles of adjacent spots will not be contiguous—otherwise portions of a magnetic pattern might be cancelled out, or distorted. Accordingly, it is a first object of this invention to provide an improved magnetic head element which may be used in the formation of magnetic patterns.

It is a still further object of this invention to provide a plural element magnetic head wherein the head is formed by positioning a plurality of head elements side by side.

In order to effect uniform character line density for a character formed by a pattern of magnetic spots, the pattern spots should be close enough together that spacing is not discernible, and accordingly, it is a still further object of this invention to provide an improved plural element magnetic head wherein the individual head elements are close enough together to produce the visual effect of a uniform line.

In a more specific embodiment, as shown in copending U.S. patent application Serial No. 577,116 filed April 9, 1956, a plural element head is spaced relatively, increment by increment, across a character position while selective ones of the head elements are energized at each increment thereby forming a predetermined magnetic pattern. In order to have the line density uniform for such character pattern formations, the polarity of contiguous spots must be arranged to prevent the cancelling out of magnetism. Accordingly, it is a still further object of this invention to provide a plural element magnetic head wherein each individual head element is operable, when energized, to produce a magnetic spot which will have an identical peripheral polarity.

It is a still further object of this invention to provide a plural element magnetic head wherein each individual head element, when energized, has an identical peripheral polarity and an identical (but opposite) central polarity.

It is a still further object of this invention to provide a magnetic head element which, when energized, is operable to form a magnetic spot having one peripheral polarity and an opposite central polarity.

Other objects of the invention will be pointed out in the following description and claims and illustrated in the accompanying drawings, which disclose, by way of example, the principle of the invention and the best mode, which has been contemplated of applying that principle.

Figures 1, 2, 3, 4, 5:
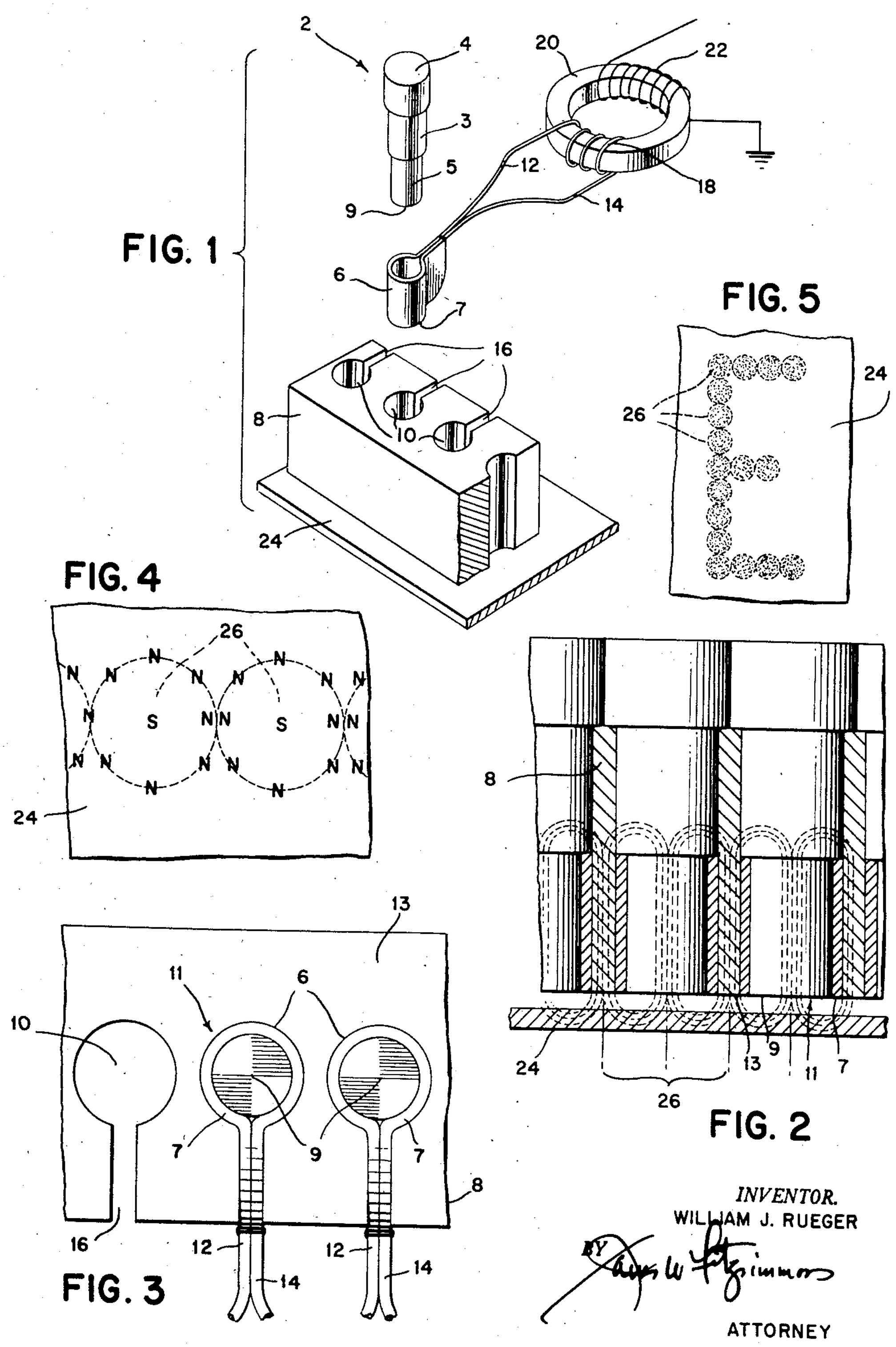
Fig. 1 is an exploded perspective view of the components of an individual magnetic head element.
Fig. 2 is a front elevation, partly in section of a plural element magnetic head.
Fig. 3 is a bottom view of a portion of the plural element head shown in Fig. 2.
Fig. 4 is a diagrammatic view showing the polarity of a plurality of individual spots as formed on a magnetic surface.
Fig. 5 is a diagrammatic view of a magnetic spot pattern in the form of letter E.

Briefly, this invention relates to an improved magnetic head having a plurality of individual identical head elements arranged in parallel juxtaposition. Each individual head element comprises a central core, and a concentric energizing loop. The core and loop assembly is mounted in a base member provided with a suitable bore thereby providing substantially total peripheral contact with the core and coil combination. With this arrangement of parts, a plural element magnetic head is provided wherein each head element will produce individual magnetic spots, each having a common central magnetic polarity, and a common (but opposite) peripheral polarity.

With reference to the drawings, and particularly to Fig. 1, a core 2 is shown as having a substantially cylindrical shape including a cylindrical body portion 3, which for purposes of definition will be described as having a normal transverse sectional area; a head portion 4 of larger diameter; and sectional area and a peg or reduced portion 5 having a diameter smaller than that of (and a transverse sectional area which is reduced with respect to that of) the body portion 3. Core 2, by definition is made from any well known flux permeable material, and is inserted into a coil or loop 6 which has an outer diameter substantially equal to the diameter of the body portion 3 and an inner diameter substantially equal to (but large enough to slidably accommodate) reduced portion 5. Furthermore, the coil or loop 6 preferably has a length substantially equal to that of the peg portion 5 with one surface 7 of coil 6 being coplanar with the end surface 9 of reduced portion 5 to provide a uniform pole face 11.

An individual magnetic head element (actually an individual magnetic head) is formed by inserting a core and coil assembly into a complementary bore in a block or base 8 made of flux permeable material. Block 8 is indicated as having a plurality of bores 10, each of which will accommodate and provide substantially total peripheral contact for a core and coil assembly, with a core head 4 limiting the depth of insertion of the unit into the base 8 whereby the surface 13 of base 8 will be coplanar with surface 7 of coil 6 and surface 9 of reduced portion 5, respectively. Coil or loop 6 comprises a generally cylindrical sleeve of copper or similar conductive material, which has been coated to electrically insulate it from both peg portion 5 and base 8. A tight "press fit" relationship is desirable, however, between the body portion 3 and the bore 10 in order to reduce to a minimum any air gap between the core 2 and block 8.

As shown in Fig. 1, each loop 6 is equipped with a pair of conductive leads 12 and 14 which extend through a slot 16 in block 8 for connection to a coil 18. Coil 18 is wrapped around a transformer core 20 which, in turn, is equipped with a primary coil 22 which may be selectively excited by some external power supply (not shown). When a pulse is provided to coil 22, the core 20 sets up a current in coil 18 by transformer action, and thereby pulses loop 6. Current flow in loop 6 generates flux lines which pass through the core 2 and exit (Fig. 2) at pole face 11 to circle back through air (or suitable magnetic material, such as plate 24, if available) into the base 8 and then complete a flux path into the core 2 again. For definition then, coil 6 sets up in core 2 a unidirectional coaxial flux pattern while the flux pattern in an energized head element is in the form of a plurality of pairs of tangential loops each lying in a coaxial plane, or for simplicity it might be described as being in the form of a toroid.

With this arrangement of the core 2, the loop 6 and the block 8, it can be appreciated that a magnetic spot 26 may be selectively generated (Fig. 2) in the plate 24, which spot 26 will have a shape corresponding to the flux lines entering and leaving it. Since the core 2, loop 6 assembly is cylindrical, in the illustrated embodiment the flux lines will produce a circular spot 26. In this respect, it is to be noted that the flux path is from the center of the spot 26 towards its periphery (or vice versa), therefore the center of the spot 26 will have one polarity while the entire periphery will have the opposite polarity (a concentric pole magnetic spot). By simply insuring an identical current flow in each of coils 6 for the individual head elements, identical polarities (e.g. same peripheral and central polarity) will be provided for contiguous spots 26 (see Fig. 4) formed in magnetic material (such as plate 24) thereby insuring against the cancelling out of magnetism.

It can be further appreciated that with the arrangement of parts as shown in Fig. 2, the individual spots 26 are formed in such a manner that they substantially touch one another, since the portion of the block 8 between adjacent bores 10 can accept the flux flow generated by two contiguous coils 6.

While in this description reference has been made to a cylindrical core 2, it should be recognized that this shape is not to be a limitation, since a core having any cross section shape will suffice, to provide a peripheral polarity and opposite central polarity, provided the energizing coil 6 peripherally surrounds the core while base 8 is in substantially total peripheral contact with the core and coil combination.

As an incidental function, it can be appreciated that by reversing the process—i.e. using the magnetic spots 26 to induce a voltage, and by putting a sufficient number of turns in coil 6, the head element can be used as a read or detecting head, as well as a write or producing head for magnetic spots.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A multi-element magnetic head for producing or detecting concentric pole magnetic spots having common peripheral polarities and common but opposite central polarities comprising a plurality of spaced apart cores of magnetic material, said cores having parallel axes lying in a common plane, an energizing coil peripherally surrounding each of said cores respectively, and a common base member of flux permeable material, said base being in peripheral contact with each of said core and coil combinations.

2. A multi-element magnetic writing head for producing concentric pole magnetic spots having common peripheral polarities and common, but opposite, central polarities comprising a plurality of cores of magnetic material, an energizing coil peripherally surrounding each of said cores respectively and means including a common base member of flux permeable material for positioning the axes of said core-coil combinations in a predetermined parallel arrangement whereby the peripheral path of the flux pattern of each of said core-coil combinations will lie in a common plane.

3. A multi-element magnetic writing head for producing concentric pole magnetic spots having common peripheral polarities and common, but opposite central polarities comprising a plurality of central cores of magnetic material, an energizing coil peripherally surrounding each of said cores respectively in a manner to induce a unidirectional coaxial flux pattern within each core and a base member of flux permeable material, said member defining a plurality of parallel axes bores for providing peripheral contact with each of said core-coil combinations thereby providing toroidal flux paths for the flux lines induced by each of said coils and with the portion of said base between adjacent cores providing unidirectional flux paths for the flux lines emanating from each of said adjacent coil-core combinations.

References Cited in the file of this patent

UNITED STATES PATENTS

| | | |
|---|---|---|
| 1,743,011 | Zimmerman | Jan. 7, 1930 |
| 1,852,594 | Snow | Apr. 5, 1932 |
| 2,514,577 | Heller | July 11, 1950 |
| 2,743,988 | Allyn | May 1, 1956 |
| 2,751,433 | Linger | June 19, 1956 |